US011775806B2

(12) United States Patent
Kim et al.

(10) Patent No.: US 11,775,806 B2
(45) Date of Patent: Oct. 3, 2023

(54) METHOD OF COMPRESSING NEURAL NETWORK MODEL AND ELECTRONIC APPARATUS FOR PERFORMING THE SAME

(71) Applicant: NOTA, INC., Daejeon (KR)

(72) Inventors: Yoo Chan Kim, Seoul (KR); Jong Won Baek, Uiwang-si (KR); Geun Jae Lee, Seoul (KR)

(73) Assignee: NOTA, INC., Daejeon (KR)

( * ) Notice: Subject to any disclaimer, the term of this patent is extended or adjusted under 35 U.S.C. 154(b) by 0 days.

(21) Appl. No.: 18/163,527

(22) Filed: Feb. 2, 2023

(65) Prior Publication Data

US 2023/0252293 A1 Aug. 10, 2023

(30) Foreign Application Priority Data

Feb. 10, 2022 (KR) .................. 10-2022-0017230
Feb. 10, 2022 (KR) .................. 10-2022-0017231
(Continued)

(51) Int. Cl.
*G06N 3/08* (2023.01)
*G06F 3/04847* (2022.01)

(52) U.S. Cl.
CPC ........... *G06N 3/08* (2013.01); *G06F 3/04847* (2013.01)

(58) Field of Classification Search
None
See application file for complete search history.

(56) References Cited

U.S. PATENT DOCUMENTS

2019/0286989 A1* 9/2019 Wang .................. G06F 8/20
2020/0193266 A1 6/2020 Scheidegger et al.
(Continued)

FOREIGN PATENT DOCUMENTS

CN 110263628 A 9/2019
CN 111723915 A 9/2020
(Continued)

OTHER PUBLICATIONS

Weng et al., Block-Based Compression and Corresponding Hardware Circuits for Sparse Activations, 2021, MDPI, pp. 1-16 (Year: 2021).*
(Continued)

*Primary Examiner* — David R Vincent
(74) *Attorney, Agent, or Firm* — BROADVIEW IP LAW, PC

(57) ABSTRACT

Disclosed is a method of compressing a neural network model that is performed by a computing device. The method includes receiving a trained model and compression method instructions for compressing the trained model, identifying a compressible block and a non-compressible block among a plurality of blocks included in the trained model based on the compression method instructions, transmitting a command to a user device that causes the user device to: display a structure of the trained model representing a connection relationship between the plurality of blocks on a first screen such that the compressible block and the non-compressible block are visually distinguished, and display, on a second screen, an input field operable to receive a parameter value entered by a user for compression of the compressible block, and compressing the trained model based on the parameter value entered by the user in the input field.

20 Claims, 12 Drawing Sheets

(30) Foreign Application Priority Data

| Feb. 23, 2022 | (KR) | 10-2022-0023385 |
| Apr. 19, 2022 | (KR) | 10-2022-0048201 |
| May 11, 2022 | (KR) | 10-2022-0057599 |
| Aug. 19, 2022 | (KR) | 10-2022-0104355 |

(56) References Cited

U.S. PATENT DOCUMENTS

| 2021/0073641 | A1 | 3/2021 | Tanizawa et al. | |
|---|---|---|---|---|
| 2021/0326710 | A1 | 10/2021 | Wang et al. | |
| 2021/0334663 | A1* | 10/2021 | Shen | G06V 10/82 |
| 2021/0397963 | A1 | 12/2021 | Jiang et al. | |
| 2022/0237454 | A1* | 7/2022 | Jain | G06N 3/082 |

FOREIGN PATENT DOCUMENTS

| CN | 2021/042828 A1 | 3/2021 |
|---|---|---|
| CN | 113283524 A | 8/2021 |
| CN | 114330714 A | 4/2022 |
| KR | 10-0926876 B1 | 11/2009 |
| KR | 10-1242983 B1 | 3/2013 |
| KR | 10-1948089 B1 | 2/2019 |
| KR | 10-2019-0119219 A | 10/2019 |
| KR | 10-2102772 B1 | 5/2020 |
| KR | 10-2020-0132627 A | 11/2020 |
| KR | 10-2021-0031627 A | 3/2021 |
| KR | 10-2021-0045274 A | 4/2021 |
| KR | 10-2021-0045845 A | 4/2021 |
| KR | 10-2021-9053020 A | 5/2021 |
| KR | 10-2021-0072559 A | 6/2021 |
| KR | 10-2021-0076641 A | 6/2021 |
| KR | 10-2021-0092575 A | 7/2021 |
| KR | 10-2283523 B1 | 7/2021 |
| KR | 10-2294714 B1 | 8/2021 |
| KR | 10-2310187 B1 | 10/2021 |
| KR | 10-2315617 B1 | 10/2021 |
| KR | 10-2021-0141252 A | 11/2021 |
| KR | 10-2021-0142829 A | 11/2021 |
| KR | 10-2022-0002046 A | 1/2022 |
| KR | 10-2022-9000039 A | 1/2022 |
| KR | 10-2422774 B1 | 7/2022 |
| WO | 2019/108923 A1 | 6/2019 |

OTHER PUBLICATIONS

Kundu, Souvik et al. "Towards Low-Latency Energy-Efficient Deep SNNs via Attention-Guided Compression." Research Paper. alarXiv: 2107.12445v1 [cs.NE] Jul. 16, 2021.

Office Action for KR 10-2022-0182086 by Korean Intellectual Property Office dated Mar. 27, 2023.

Office Action for U.S. Appl. No. 18/163,242 by United States Patent and Trademark Office dated Apr. 19, 2023.

International Search Report for PCT/KR2023/001895 by Korean Intellectual Property Office dated Apr. 20, 2023.

Tejalal Choudhary et al., "A transfer learning with structured filter pruning approach for improved breast cancer classification on point-of-care devices". Computers in Biology and Medicine 134, 1-13pages (2021.).

Lee, Jinsu et al. "An Overview of Energy-Efficient Hardware Accelerators for On-Device Deep-Neural-Network Training". Paper. School of Electrical Engineering, Korea Advanced Institute of Science and Technology. Oct. 13, 2021.

Lim, Seung-Ho et al. "Architecture Exploration and Customization Tool of Deep Neural Networks for Edge Devices". 2022 IEEE International Conference on Consumer Electronics (ICCE).

Lu, Bingqian et al. "Automating Deep Neural Network Model Selection for Edge Inference". 2019 IEEE First International Conference on Cognitive Machine Intelligence (CogMI).

Guo, Peizhen et al. "Mistify: Automating DNN Model Porting for On-Device Inference at the Edge". Proceedings of the 18th USENIX Symposium on Networked Systems Design and Implementation. Apr. 12-14, 2021.

Yeager, Luke et al. "DIGITS: the Deep learning GPU Training System". ICML 2015 AutoML Workshop. 2015.

Sharma, Hardik et al. "From High-Level Deep Neural Models to FPGAs". Alternative Computing Technologies (ACT) Lab. School of Computer Science, Georgia Institute of Technology.

Lu, Bingqian et al. "One Proxy Device Is Enough for Hardware-Aware Neural Architecture Search". Association for Computing Machinery. Proc.ACM Meas. Anal. Compute. Syst., vol. 5, No. 3, Article 34. Dec. 2021.

Torsten Hoefler et al., "Sparsity in Deep Learning: Pruning and growth for efficient inference and training in neural hetworks". Journal of Machine Learning Research 23, 1-124pages (2021.).

Grant of Patent for JP 2023-076065 by Japan Patent Office dated Jun. 6, 2023.

Luo, Jian-Hao et al. "ThiNet: A Filter Level Pruning Method for Deep Neural Network Compression." National Key Laboratory for Novel Software Technology, Nanjing University, Nanjing, China. Shanghai Jiao Tong University, Shanghai, China. arXiv: 1707.06342v1 [cs.CV] Jul. 20, 2017.

Office Action for KR 10-2023-0074346 by Korean Intellectual Property Office dated Aug. 22, 2023.

Office Action for U.S. Appl. No. 18/163,242 by United States Patent and Trademark Office dated Aug. 17, 2023.

Zhu, Hongyu et al. (2018). "TBD: Benchmarking and Analyzing Deep Neural Network Training", ArXiv e-print. arXiv:1803.06905v2 [cs.LG].

* cited by examiner

300 — Compression info

310 — Model name *
Placeholder

320 — Memo
Placeholder

330 — Select a base model
Base model *
Placeholder

340 — Compression options
Compression ratio *
0.5

FIG.3

METHOD OF COMPRESSING NEURAL NETWORK MODEL AND ELECTRONIC APPARATUS FOR PERFORMING THE SAME

CROSS-REFERENCE TO RELATED APPLICATIONS

This application claims priority from Korean Patent Application No. 10-2022-0017230 filed in the Korean Intellectual Property Office on Feb. 10, 2022, Korean Patent Application No. 10-2022-0017231 filed in the Korean Intellectual Property Office on Feb. 10, 2022, Korean Patent Application No. 10-2022-0023385 filed in the Korean Intellectual Property Office on Feb. 23, 2022, Korean Patent Application No. 10-2022-0048201 filed in the Korean Intellectual Property Office on Apr. 19, 2022, and Korean Patent Application No. 10-2022-0057599 filed in the Korean Intellectual Property Office on May 11, 2022, and Korean Patent Application No. 10-2022-0104355 filed in the Korean Intellectual Property Office on Aug. 19, 2022, the disclosures of which are incorporated herein by reference.

BACKGROUND

Field of the Invention

The present disclosure relates to a method of compressing a neural network model and an electronic apparatus for performing the same.

Discussion of Related Art

With the spread of artificial intelligence technology, the needs of users who need an artificial intelligence model to run an artificial intelligence model in a target device are increasing. Although various artificial intelligence models are being released around the world, it is not easy for users to directly find an artificial intelligence model that has performance that they want. In addition, even if users find models with excellent performance such as a state-of-the-art (SOTA) model, the models are not necessarily operable on a target device. For this reason, users have trouble of checking whether the models can be run on the target device.

Accordingly, there is a need for a technology of allowing users to conveniently acquire a neural network model optimized for a target device.

SUMMARY OF THE INVENTION

The present disclosure provides an electronic apparatus that provides a neural network model optimized for a target device.

The present disclosure also provides an electronic apparatus that provides a neural network model trained based on a data set input by a user.

The present disclosure also provides an electronic apparatus that provides a compressed neural network model trained based on a compression configuring value input by a user.

The present disclosure also provides an electronic apparatus that provides download data corresponding to a compressed neural network model.

Objects of the present disclosure are not limited to the above-mentioned objects. That is, other objects that are not described may be obviously understood by those skilled in the art to which the present disclosure pertains from the following description.

The present disclosure may provide a method of compressing a neural network model that is performed by a computing device, comprising: receiving, at a processor of the computing device, a trained model and compression method instructions for compressing the trained model; identifying, via the processor, a compressible block and a non-compressible block among a plurality of blocks included in the trained model based on the compression method instructions; transmitting, via a computer network, a command to a user device that causes the user device to: display a structure of the trained model representing a connection relationship between the plurality of blocks on a first screen such that the compressible block and the non-compressible block are visually distinguished, and display, on a second screen, an interactive input field operable to receive a parameter value entered by a user for compression of the compressible block; and compressing the trained model based on the parameter value entered by the user in the interactive input field.

When the compression method instructions configure a method of pruning, the identifying may comprise identifying among the plurality of blocks a non-compressible block which includes an activation function, a normalization function and an output channel that are directly connected to an arithmetic operator.

When the compression method instructions configure a method of filter decomposition, the identifying may comprise identifying among the plurality of blocks the compressible block which includes a convolutional layer.

The structure of the trained model may be represented by a connection between a plurality of user interface (UI) elements, each of the plurality of UI elements is associated with a respective one block of the plurality of blocks included in the trained model, each of the plurality of UI elements represents information on an associated block of the plurality of blocks, and the information on the associated block of the plurality of blocks may include identification information for the associated block and latency data corresponding to the associated block.

The method may further comprise receiving information, via a computer network, about a target device on which the trained model is to be executed; and receiving a plurality of latency data from the target device, wherein each latency data of the plurality of latency data may be associated with a respective one block of the plurality of blocks.

When a user selects a first UI element that corresponds to the compressible block and that is displayed on the first screen, the method may further comprise transmitting a command to the user device to activate the interactive input field corresponding to the compressible block displayed on the second screen.

When a user selects a second UI element that corresponds to the non-compressible block and that is displayed on the first screen, the method may further comprise transmitting a command to the user device to display detailed information about the non-compressible block on the first screen, wherein the detailed information on the non-compressible block may include at least one of a quantity of channels or a size of a kernel included in the non-compressible block.

The structure of the trained model may be a tree structure.

When a user selects a first UI element that corresponds to the compressible block and that is displayed on the first screen, the method may further comprise transmitting a command to the user device to display detailed information on the compressible block on the first screen, wherein the detailed information on the compressible block may include at least one of a quantity of channels or the size of a kernel included in the compressible block.

The first UI element may include a check box.

The present disclosure may provide an electronic apparatus for compressing a neural network model, comprising: a communication interface, configured to send and receive data via a data network, including at least one communication circuit; a non-transitory memory configured to store at least one operation instruction; and a processor, wherein execution of the at least one operation instruction causes the processor to: receive a trained model and compression method instructions for compressing the trained model; identify a compressible block and a non-compressible block among a plurality of blocks included in the trained model based on the compression method instructions; transmit a command to a user device via the communication interface that results in the user device: displaying a structure of the trained model representing a connection relationship between the plurality of blocks on a first screen such that the compressible block and the non-compressible block are visually distinguished, and displaying an interactive input field operable to receive a parameter value for compression of the compressible block on a second screen; and compressing the trained model based on the parameter value entered by the user in the interactive input field.

When the compression method instructions correspond to a method of pruning, the processor may be further configured to: identify among the plurality of blocks a non-compressible block which includes an activation function, a normalization function, and an output channel that are directly connected to an arithmetic operator.

When the compression method instructions correspond to a method of filter decomposition, the processor may be further configured to: identify among the plurality of blocks the compressible block which includes a convolutional layer.

The structure of the trained model may be represented as connections between a plurality of user interface (UI) elements, wherein each of the plurality of UI elements: may be associated with a respective one block of the plurality of blocks included in the trained model, and represent information regarding an associated block of the plurality of blocks, including identification information for the associated block, and latency data corresponding to the associated block.

The processor may be further configured to: receive information about a target device on which the trained model is to be executed; and receive a plurality of latency data from the target device, wherein each latency data of the plurality of latency data may correspond to a respective block of the plurality of blocks.

When a user selects a first UI element that corresponds to the compressible block and that is displayed on the first screen, the processor may be further configured to cause the communication interface to transmit a command to the user device to activate the interactive input field corresponding to the compressible block displayed on the second screen.

When a user selects a second UI element that corresponds to the non-compressible block and that is displayed on the first screen, the processor may be further configured to cause the communication interface to transmit a command to the user device to display detailed information about the non-compressible block on the first screen, and wherein the detailed information on the non-compressible block may include at least one of a quantity of channels or a size of a kernel included in the non-compressible block.

When a user selects a first UI element that corresponds to the compressible block and that is displayed on the first screen, the processor may be further configured to transmit a command to the user device to display detailed information on the compressible block on the first screen, and wherein the detailed information on the compressible block may include at least one of a quantity of channels or the size of a kernel included in the compressible block.

Technical solutions of the present disclosure are not limited to the abovementioned solutions, and solutions that are not mentioned will be clearly understood by those skilled in the art to which the present disclosure pertains from the present specification and the accompanying drawings.

BRIEF DESCRIPTION OF THE DRAWINGS

Aspects, features, and advantages of specific embodiments of the present disclosure will become more apparent from the following description with reference to the accompanying drawings:

FIG. 3 is a diagram showing a compression setting screen of a first compression mode in accordance with embodiments of the present disclosure;

DETAILED DESCRIPTION OF EXEMPLARY EMBODIMENTS

Figure 1:
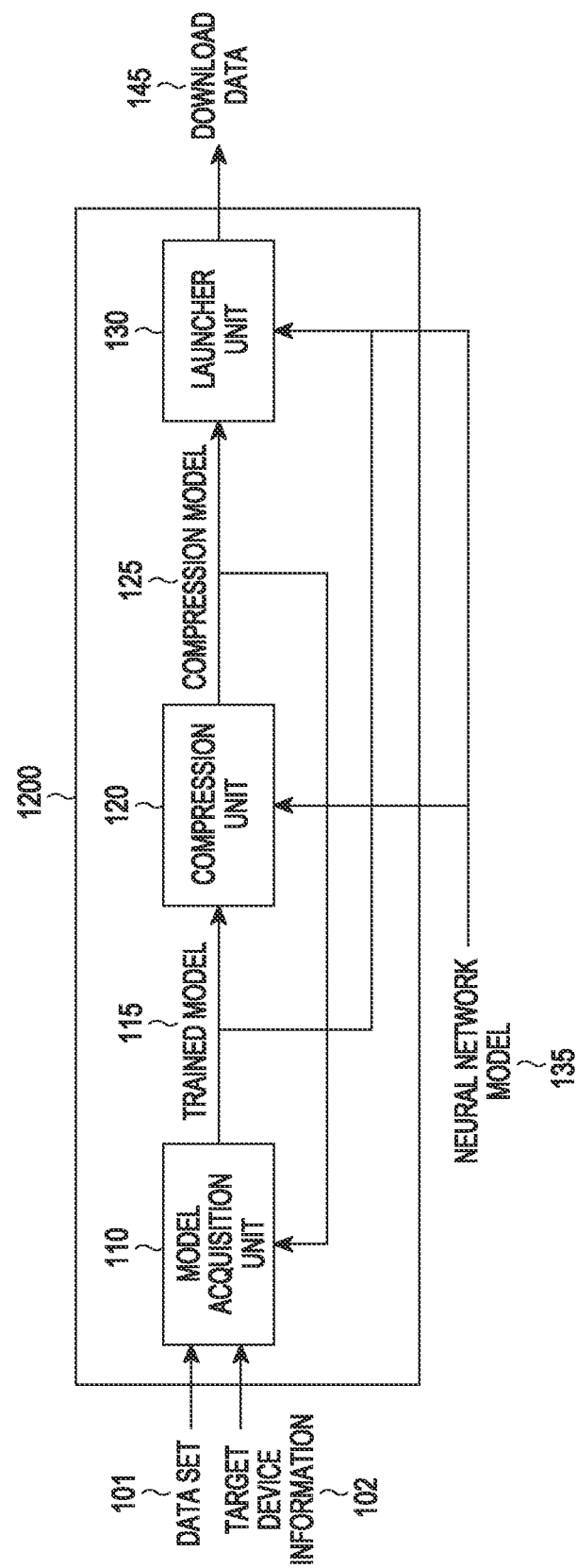
FIG. 1 is a diagram showing an operation of an electronic apparatus in accordance with embodiments of the present disclosure.

Terms used in the present specification will be briefly described, and then the present disclosure will be described in detail.

General terms that are currently widely used are selected as terms used in embodiments of the present disclosure in consideration of functions in the present disclosure, but may be changed depending on the intention of those skilled in the art or a judicial precedent, the emergence of a new technique, and the like. In addition, in a specific case, terms arbitrarily chosen by an applicant may be used. In this case, the meaning of such terms will be mentioned in detail in a corresponding description portion of the present disclosure. Therefore, the terms used in the present disclosure should be defined on the basis of the meaning of the terms and the contents throughout the present disclosure rather than simple names of the terms.

The present disclosure may be variously modified and have several embodiments, and therefore specific embodiments of the present disclosure will be illustrated in the accompanying drawings and given in detail in the detailed description. However, it is to be understood that the present disclosure is not limited to specific exemplary embodiments, but includes all modifications, equivalents, and substitutions without departing from the scope and spirit of the present disclosure. When it is determined that a detailed description of the known art related to the present disclosure may obscure the gist of the present disclosure, the detailed description will be omitted.

Terms "first," "second," and the like, may be used to describe various components, but the components are not to be construed as being limited by these terms. The terms are used only to distinguish one component from another component.

Singular forms are intended to include plural forms unless the context clearly indicates otherwise. More specifically, as used herein and in the appended claims, the singular forms "a," "an," "said," and "the" include plural referents unless the context clearly dictates otherwise. It should be understood that terms "comprise" and "include" used in the present specification specify the presence of features, numerals, steps, operations, components, parts mentioned in the present specification, or combinations thereof, but do not preclude the presence or addition of one or more other features, numerals, steps, operations, components, parts, or combinations thereof.

Hereinafter, embodiments of the present disclosure will be described in detail with reference to the accompanying drawings so that those skilled in the art to which the present disclosure pertains may easily practice the present disclosure. However, the present disclosure may be modified in various different forms, and is not limited to the embodiments described herein. In addition, in the drawings, portions unrelated to the description will be omitted to obviously describe the disclosure, and similar reference numerals will be used to describe similar portions throughout the specification.

The details of embodiments set forth herein, both as to structure and operation, are provided in the accompanying figures, in which like reference numerals refer to like or corresponding elements among the various views. The elements in the figures are not necessarily to scale, emphasis instead being placed upon illustrating the principles of the embodiments. Moreover, all illustrations are intended to convey concepts, where relative sizes, shapes and other detailed attributes may be illustrated schematically rather than literally or precisely.

The present disclosure may provide a method for providing a neural network model that is performed by a computing device, comprising: receiving, at a processor of the computing device, a trained model that has been trained based on a data set and a target device identified in a device farm using information about the target device that has been inputted by a user; compressing the trained model based on compression configuring information and latency information received from the device farm; and providing download data corresponding to the compressed trained model so that the compressed trained model is deployed on the target device.

The compression configuring information may include a first compression mode indicating that the trained model is compressed based on a model compression configuring value that is configured by the user. When the first compression mode is configured, the compressing the trained model may comprise: identifying a plurality of compressible target blocks among a plurality of blocks included in the trained model; deriving a first set of compression parameters, including block compression configuring values for block compression applied to a respective one of the plurality of target blocks, based on both the model compression configuring value and a predefined algorithm; and compressing the plurality of compressible target blocks based on the first set of compression parameters.

The compressing the trained model may further comprise providing the first set of compression parameters to the user. When the block compression configuring values is modified by the user, the compressing the trained model may further comprise compressing the plurality of target blocks based on a second set of compression parameters including the modified block compression configuring values.

The compression configuring information may include a second compression mode indicating that information on a block included in the trained model is provided and the trained model is compressed based on block compression configuring values configured by the user. When the second compression mode is configured, the compressing may comprise: identifying a plurality of compressible target blocks among a plurality of blocks included in the trained model; providing information on the plurality of target blocks to the user; receiving a set of third compression parameters including the block compression configuring values applied to a respective one of the plurality of target blocks, where the block compression configuring values have been configured by the user for the compression of the plurality of target blocks; and compressing the plurality of target blocks based on the set of third compression parameters.

The information on the block included in the training model may include at least one of identification information of the block, a latency corresponding to the block, or a quantity of channels included in the block.

The compressing the trained model may further comprise: receiving a plurality of latency data from the target device, wherein each latency data of the plurality of latency data may be associated with a respective one block of the plurality of blocks, wherein each latency data of the plurality of latency data may be acquired by executing an associated block of the plurality of blocks by the target device.

The compression configuring information may include at least one of compression methods, compression configuring values, or reference information for determining a compression target among a plurality of channels included in the trained model.

The method may further comprise: receiving, at the processor, a user command for retraining the compressed trained model; generating a retrained model based on the compressed trained model, and providing download data corresponding to the retrained model.

The method may further comprise: performing, at the processor, at least one quantization or calibration operation on the compressed trained model based on the information about the target device.

The present disclosure may provide an electronic apparatus for providing a neural network model, comprising: a communication interface, configured to send and receive data via a data network, including at least one communication circuit; a memory configured to store at least one operation instruction; and a processor, wherein execution of the at least one operation instruction causes the processor to: receive a trained model that has been trained based on a data set and a target device identified in a device farm using information about the target device that has been inputted by a user; compress the trained model based on compression configuring information and latency information received from the device farm; and provide download data corresponding to the compressed trained model so that the compressed trained model is deployed on the target device.

The compression configuring information may include a compression mode indicating that the trained model is compressed based on a model compression configuring value that is configured by the user. When the first compression mode is configured, the processor may identify a plurality of compressible target blocks among a plurality of blocks included in the trained model, derive a first set of compression parameters, including block compression configuring values for block compression applied to a respective one of the plurality of target blocks based on both the model compression configuring value and a predefined algorithm, and compress the plurality of compressible target blocks based on the first set of compression parameters.

The processor may provide the first set of compression parameters to the user. When at least one of the block compression configuring values is modified by the user, the processor may compress the plurality of target blocks based on a second set of compression parameters including the modified at least one of the block compression configuring values.

The compression configuring information includes a second compression mode indicating that information on a block included in the trained model is provided. The trained model may be compressed based on block compression configuring values configured by the user. When the second compression mode is configured, the processor may identify a plurality of compressible target blocks among a plurality of blocks included in the trained model, provide information on the plurality of target blocks to the user, receive a set of third compression parameters including the block compression configuring values applied to a respective one of the plurality of target blocks, where the block compression configuring values have been configured by the user for the compression of the plurality of target blocks, and compress the plurality of target blocks based on the set of third compression parameters.

The information on the block included in the training module may include at least one of identification information of the block, a latency corresponding to the block, or a quantity of channels included in the block.

The processor may receive a plurality of latency data from the target device. Each latency data of the plurality of latency data may be associated with a respective one block of the plurality of blocks. Each latency data may be acquired by executing an associated block of the plurality of blocks by the target device.

The compression configuring information may include at least one of a compression method, a compression configuring values, or reference information for determining a compression target among a plurality of channels included in the trained model.

The processor may receive a user command for retraining the compressed trained model, generate a retrained model based on the compressed trained model, and provide download data corresponding to the retrained model.

The processor may quantize or calibrate the compressed trained model based on the information about the target device.

The processor may determine a compression configuring value of the trained model based on the latency information.

FIG. 1 is a diagram for describing an operation of an electronic apparatus according to an embodiment of the present disclosure.

Referring to FIG. 1, the electronic apparatus 1200 may include a model acquisition unit 110, a compression unit 120, and a launcher unit 130. The model acquisition unit 110, the compression unit 120, and the launcher unit 130 may be implemented as a software module. The processor 1230 may load and execute instructions related to each unit into the memory 1220.

The model acquisition unit 110 may acquire a trained model 115 based on a data set 101 and target device information 102 (or information on the target device). For example, The model acquisition unit 110 may perform a first project to acquire a first trained model. The model acquisition unit 110 may receive a compressed model 125 from the compression unit 120. The model acquisition unit 110 may acquire a retrained model by performing a third project configured based on the compressed model 125.

The model acquisition unit 110 may transmit the trained model 115 to the compression unit 120 or the launcher unit 130. For example, The model acquisition unit 110 may transmit the first trained model to the compression unit 120. The model acquisition unit 110 may transmit the retrained model to the launcher unit 130. Other operations (e.g., an operation of performing a project) of the electronic apparatus 1200 related to The model acquisition unit 110 have been described above, and detailed descriptions thereof will be omitted.

The compression unit 120 may output a lightweight model by performing compression on the input model. The compression unit 120 may compress the trained model 115 or a neural network model 135 to generate the compressed model 125. The neural network model 135 may be a predetermined model that has not been acquired by The model acquisition unit 110. The compression unit 120 may transmit the compressed model 125 to the launcher unit 130 or The model acquisition unit 110.

The compression unit 120 may compress the input model based on the compression configuring information configured by the user. The compression configuring information may include at least one of a compression mode, a compression method, a compression configuring value, or reference information for determining a compression target among a plurality of channels included in the input model. The compression mode may include a first compression mode for the compression of the input model based on a model compression configuring value configured by a user for the compression of the input model. The compression mode may include a second compression mode that provides information on a block included in the input model to a user and compresses the trained model based on a block compression configuring value configured by the user for the block compression.

The launcher unit 130 may output download data 145 corresponding to the input model to be deployed on the target device. The model input to the launcher unit 130 may include the compressed model 125, the neural network model 135, and a retrained model.

The launcher unit 130 may perform quantization on the input model based on the target device information 102. The target device information 102 may include a data type (e.g., an 8-bit integer type) supported by the target device. The launcher unit 130 may convert the data type of the input model into a data type supported by the target device.

The launcher unit 130 may perform calibration on the input model. The launcher unit 130 may perform calibration based on a code input by a user or a pre-stored code. For example, the launcher unit 130 may adjust a quantization interval. The launcher unit 130 may perform quantization based on the adjusted quantization interval. Accordingly, parameter values (e.g., weight values) of the input model or the quantized model may be changed.

The launcher unit 130 may provide the download data 145 to a user. The download data 145 may mean a download file, a download package, or similar collection of data. When the user requests the download data 145, the launcher unit 130 may transmit the download data 145 to the user device. Accordingly, a neural network model optimized for the target device may be installed in the user device.

Figure 2:
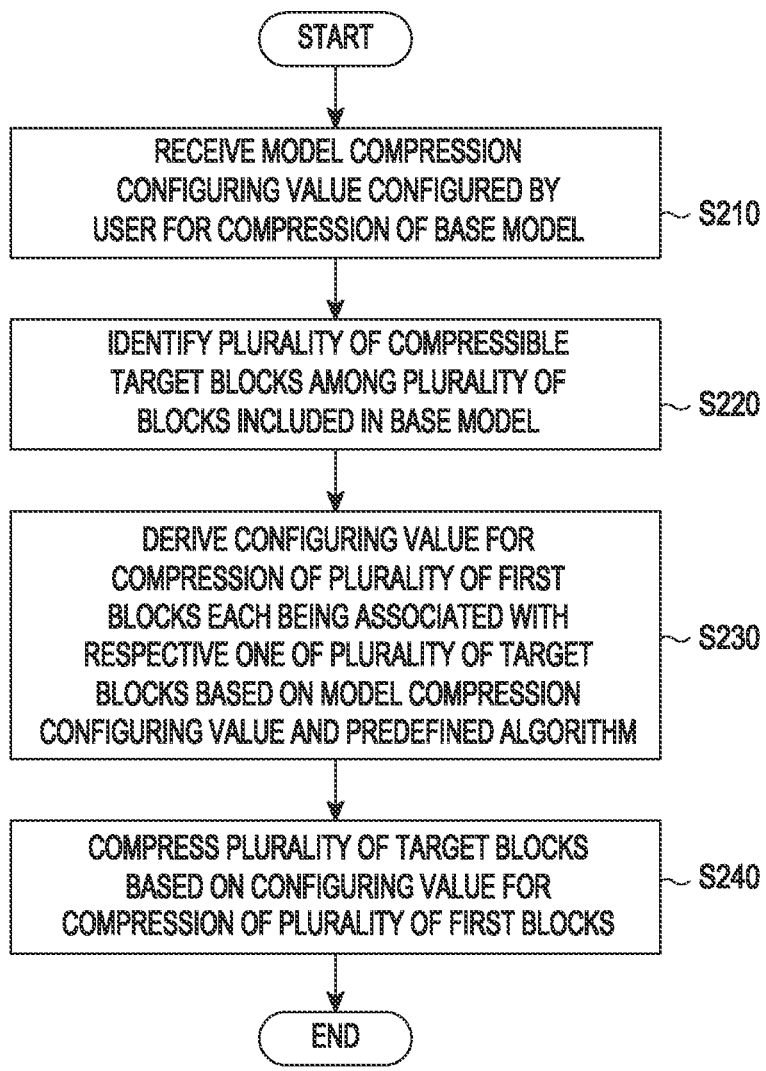
FIG. 2 is a diagram showing a first compression mode in accordance with embodiments of the present disclosure.

FIG. 2 is a diagram for describing a first compression mode according to an embodiment of the present disclosure. Each operation may be performed by The processor 1230.

Referring to FIG. 2, the electronic apparatus 1200 may receive a model compression configuring value configured by a user for compression of a base model (S210). For example, a model compression configuring value may include a value for determining a pruning ratio indicating a pruning degree and the number of ranks. The base model may include a trained model 115 and a neural network model 135 acquired by The model acquisition unit 110.

The electronic apparatus 1200 may identify a plurality of compressible target blocks among a plurality of blocks included in the base model (S220). A block may be a layer set including at least one layer. A block may contain various types of layers. For example, a block may include a convolution layer, an activation function, a regularization function, and an arithmetic operator (e.g., an addition operator or a multiplication operator).

The electronic apparatus 1200 may identify blocks other than a block predefined as non-compressible blocks as a target block. The block predefined as non-compressible may include a block including an activation function or a normalization function. In addition, a block predefined as non-compressible may include a block in which an output channel is directly connected to an arithmetic operator. Here, the fact that the output channel is directly connected to the arithmetic operator may mean that a block having a weight value does not exist between the output channel and the arithmetic operator. For example, a block immediately preceding the arithmetic operator may be a non-compressible block.

The electronic apparatus 1200 may derive a configuring value for compression of a plurality of first blocks each being associated with a respective one of the plurality of target blocks based on a model compression configuring value and a predefined algorithm (S230). The predefined algorithm may include so-called layer-adaptive sparsity for the magnitude-based pruning (LAMP) and variational Bayesian matrix factorization (VBMF). The block compression configuring value may include a pruning ratio indicating a pruning degree of an individual block and the number of ranks. In the present disclosure, the model compression configuring value may mean a value corresponding to the entire model, and the model compression configuring value may mean a value corresponding to an individual block included in the model.

The electronic apparatus 1200 may derive the block compression configuring value based on the latency acquired from the device farm. For example, the electronic apparatus 1200 may acquire a greater compression ratio to be applied to the block as the latency corresponding to the block increases. Also, the electronic apparatus 1200 may adjust a block compression configuring value acquired based on the predefined algorithm using the latency acquired from the device farm.

The electronic apparatus 1200 may compress a plurality of target blocks based on a configuring value for compression of a plurality of first blocks (S240). Accordingly, the electronic apparatus 1200 may acquire a compressed model. For example, the electronic apparatus 1200 may perform pruning on a plurality of target blocks. Alternatively, the electronic apparatus 1200 may perform filter decomposition (or tensor decomposition) on a plurality of target blocks.

The electronic apparatus 1200 may provide a configuring value for compression of the plurality of first blocks to a user. For example, the electronic apparatus 1200 may transmit, to a user device, a command related to a display of a configuring value for compression of a plurality of first blocks and a configuring value for compression of a plurality of first blocks so that configuring values for compression of a plurality of blocks may be displayed on the user device. Accordingly, the user device may display the configuring value for compression of the plurality of first blocks.

The user may modify at least one block compression configuring value among the configuring values for the compression of the plurality of first blocks. The electronic apparatus 1200 may receive a user command for modifying a configuring value for compression of at least one first block from the user device. The electronic apparatus 1200 may compress a plurality of target blocks based on the user command.

In a first compression mode, a user may obtain a lightweight model by inputting only a configuring value for compression of a single model. Accordingly, user convenience may be improved. In another embodiment, a user may input a configuring value for compressing a plurality of models each being associated with a respective one of the plurality of compression methods. For example, a user may input a configuring value for first model compression corresponding to pruning and a configuring value for second model compression corresponding to filter decomposition.

FIG. 3 is a compression setting screen of a first compression mode according to an embodiment of the present disclosure.

Referring to FIG. 3, a compression setting screen 300 may include a first region 310 for receiving a name of a compressed model, a second region 320 for receiving a user memo for compression, a third region 330 for receiving a base model to be compressed, and a fourth region 340 for receiving a model compression configuring value. The compression setting screen 300 may be displayed on a user device.

The user device may transmit information input to the compression setting screen 300 to the electronic apparatus 1200. The electronic apparatus 1200 may acquire a configuring value for compression of a plurality of blocks corresponding to a plurality of target blocks included in the base model based on the information input to the compression setting screen 300. The electronic apparatus 1200 may identify a model selected in the third region 330 as a base model. The third region 330 may be provided with a model list including the trained model 115 and the neural network model 135 acquired by The model acquisition unit 110. The electronic apparatus 1200 may acquire a plurality of compression ratios corresponding to a plurality of target blocks based on a compression ratio configured by a user in the fourth region 340.

The electronic apparatus 1200 may acquire a model compression configuring value corresponding to a predetermined compression method based on a model compression configuring value configured by a user. The predetermined compression method may include pruning and/or filter decomposition. For example, the electronic apparatus 1200 may acquire a pruning ratio corresponding to a target block based on a compression ratio configured by a user. Alternatively, the electronic apparatus 1200 may acquire the number of ranks corresponding to a target block based on a compression ratio configured by a user. The predetermined compression method may be configured by a user.

The predetermined compression method may be plural. For example, the electronic apparatus 1200 may acquire a pruning ratio and the number of ranks corresponding to a target block based on a compression ratio configured by a user. The electronic apparatus 1200 may perform the pruning and filter decomposition on the base model.

Meanwhile, a user may set the compression method and the model compression configuring value together. For example, the user may select the pruning as the compression method and input a pruning ratio corresponding to the base model. In this case, the electronic apparatus 1200 may acquire a pruning ratio corresponding to a target block included in the base model based on the pruning ratio corresponding to the base model.

Although not illustrated in FIG. 3, the compression setting screen 300 may include a compression method selection region for acquiring a user command for selecting a compression method. Alternatively, the compression method selection region may be provided on a separate screen.

Figure 4:
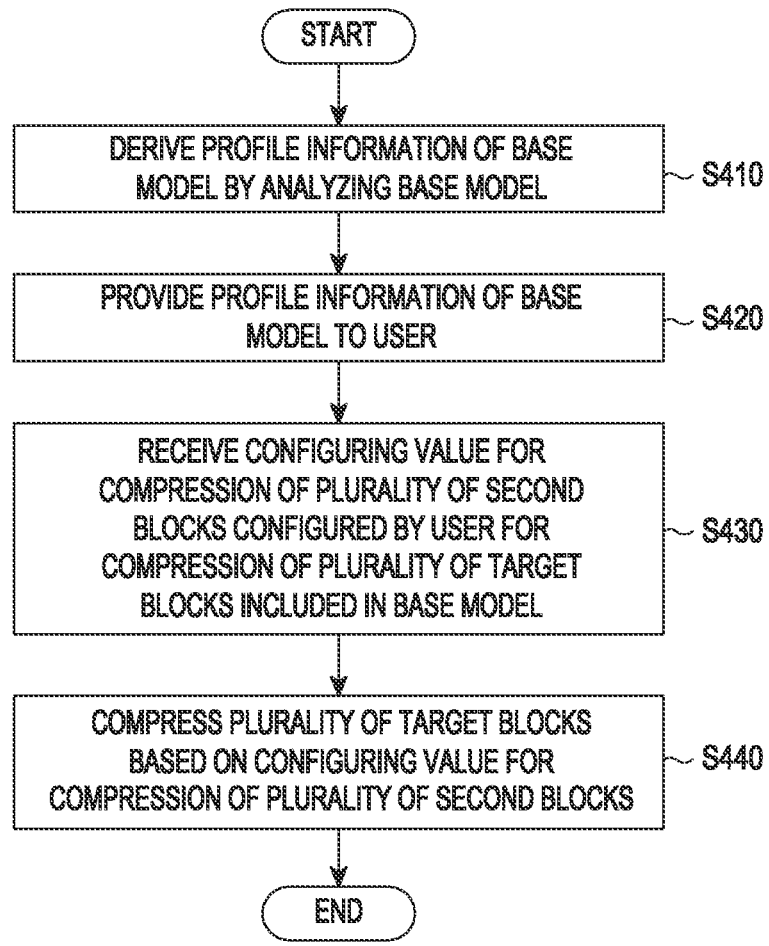
FIG. 4 is a diagram showing a second compression mode in accordance with embodiments of the present disclosure.

FIG. 4 is a diagram for describing a second compression mode according to an embodiment of the present disclosure. Each operation may be performed by The processor 1230.

Referring to FIG. 4, the electronic apparatus 1200 may derive profile information of a base model by analyzing the base model (S410). The profile information of the base model may include information on each block included in the base model. Information on each block may include identification information of a block, a latency corresponding to the block, the quantity of channels included in the block, and a size of a kernel included in the block.

The electronic apparatus 1200 may provide profile information of a base model to a user (S420). The electronic apparatus 1200 may transmit the profile information of the base model to a user device. The user device may display the profile information of the base model.

The electronic apparatus 1200 may receive a configuring value for compression of a plurality of second blocks configured by a user for compression of a plurality of target blocks included in the base model (S430). A configuring value for compression of a plurality of second blocks may correspond to a plurality of target blocks, respectively.

The electronic apparatus 1200 may compress a plurality of target blocks based on a configuring value for compression of a plurality of second blocks (S440). For example, the electronic apparatus 1200 may perform pruning or filter decomposition on a plurality of target blocks. Accordingly, the electronic apparatus 1200 may acquire a lightweight model.

Figure 5:
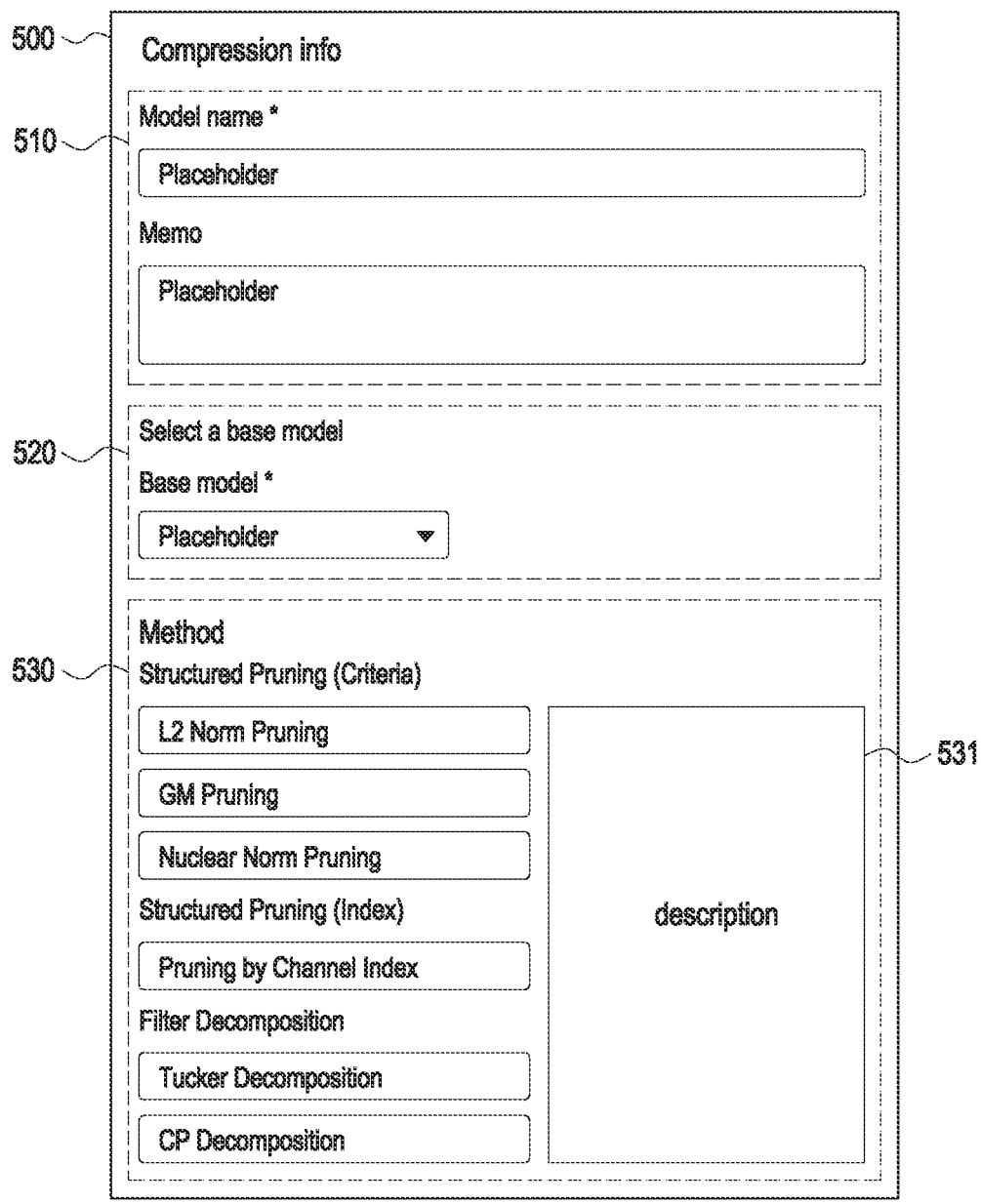
FIG. 5 is a diagram showing a compression setting screen of a second compression mode in accordance with embodiments of the present disclosure.

FIG. 5 is a compression setting screen of a second compression mode according to an embodiment of the present disclosure.

Referring to FIG. 5, a compression setting screen 500 may include a first region 510 for receiving a name and a memo of a compressed model, a second region 520 for receiving a base model to be compressed, and a third region 530 for receiving a compression method. A description 531 of the selected compression method may be displayed in the third region 530.

The compression method may include pruning and filter decomposition. The pruning may include a first type of pruning based on a criterion and a second type of pruning based on an index configured by a user. The filter decomposition may include tucker decomposition and canonical polyadic (CP) decomposition. The compression setting screen 500 may be displayed on a user device. The user device may transmit user input-related information input to the compression setting screen 500 to the electronic apparatus 1200. The electronic apparatus 1200 may perform compression on a base model based on the base model and compression method selected by the user.

Figure 6:
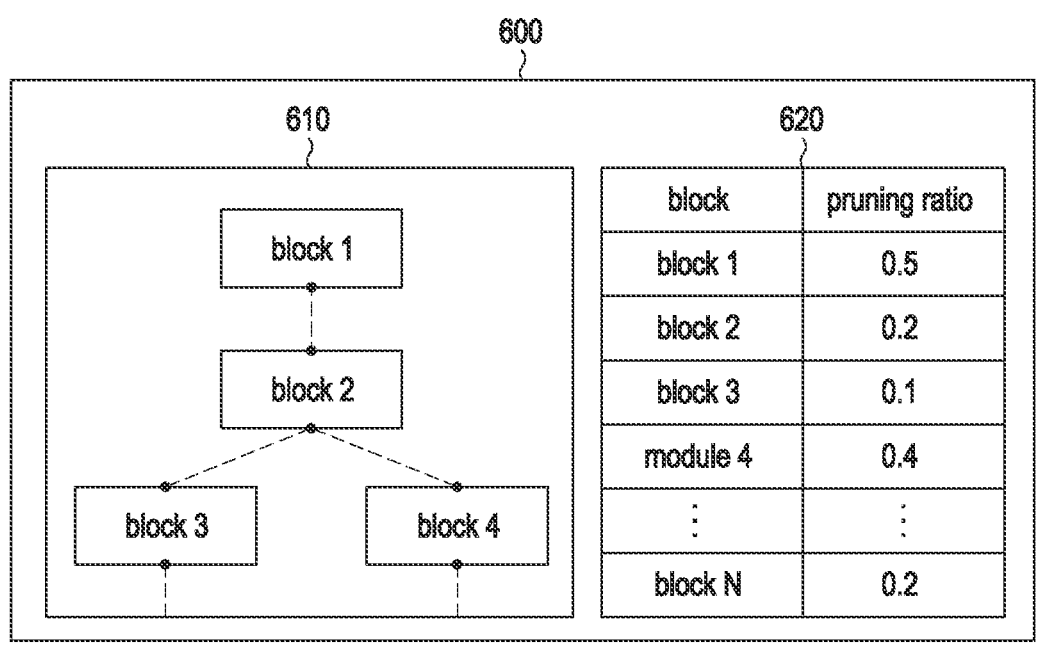
FIG. 6 is a diagram showing a screen for setting a block compression configuring value in accordance with embodiments of the present disclosure.

FIG. 6 is a screen for setting a block compression configuring value according to an embodiment of the present disclosure.

Referring to FIG. 6, a screen 600 for setting a block compression configuring value may include a first screen 610 on which information on a base model is displayed and a second screen 620 for receiving a block compression configuring value. The architecture of the base model may be displayed on the first screen 610. Also, the latency corresponding to each block and the quantity of channels included in the model may be displayed on the first screen 610.

The user device may acquire a user input for setting a block compression configuring value on the second screen 620. For example, the user device may acquire a configuring value (e.g., 0.5) for first block compression corresponding to the first block (block 1). The user device may transmit a configuring value for first block compression to the electronic apparatus 1200. The electronic apparatus 1200 may compress the first block based on the configuring value for first block compression.

As such, in the second compression mode, the user may set a block compression configuring value desired for each block, and acquire a compressed model in which each block is compressed as much as desired. Accordingly, the user satisfaction may be improved.

Although not illustrated, a UI element for selecting a compression policy may be displayed on the compression setting screen 500 or the screen 600. The compression policy may mean a rule on how to perform compression. For example, when the compression method is pruning, the channel to be pruned may vary according to the compression policy even if the configuring value for compression is the same.

Figure 7:
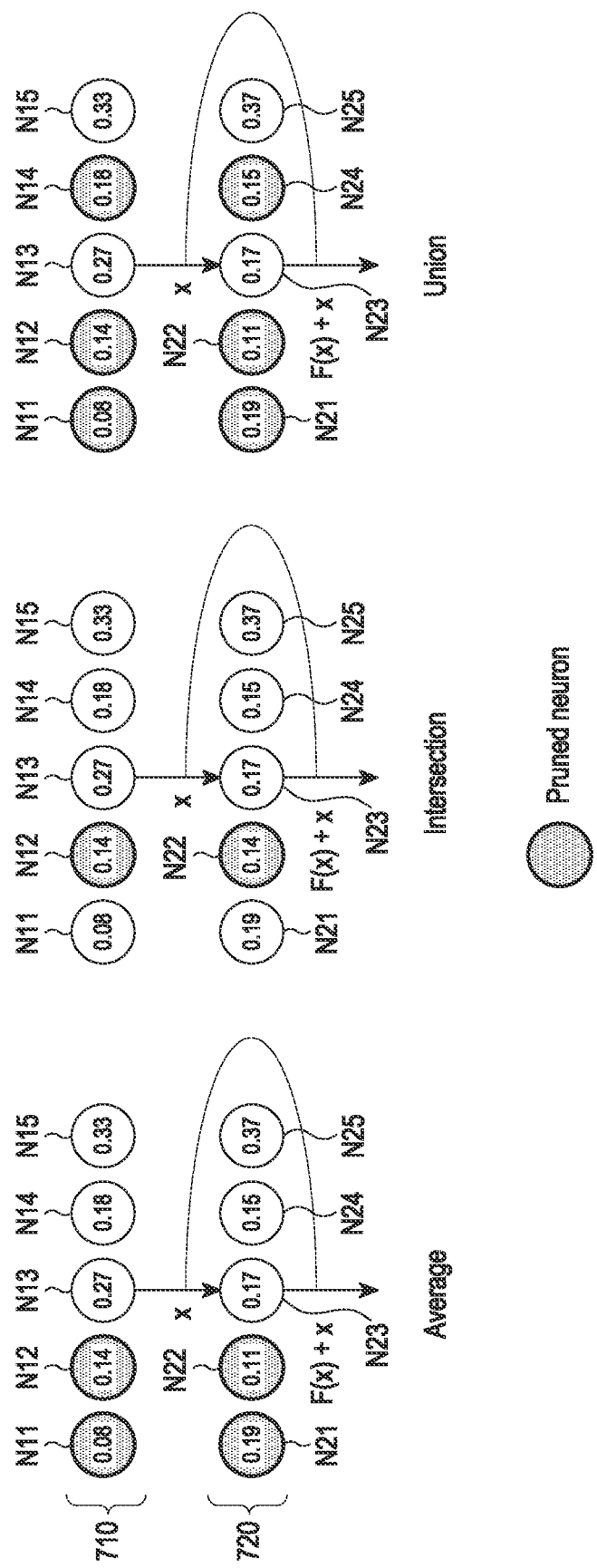
FIG. 7 is a diagram showing a compression policy in accordance with embodiments of the present disclosure.

FIG. 7 is a diagram for describing a compression policy according to an embodiment of the present disclosure. Specifically, FIG. 7 illustrates nodes that are pruned for three compression policies.

Referring to FIG. 7, a block may include a first layer 710 and a second layer 720. The first layer 710 may include a plurality of nodes N11, N12, N13, N14, and N15. The second layer 720 may include a plurality of nodes N21, N22, N23, N24, and N25. The node N11 and the node N21 have the same index. The node N12 and node N22 have the same index. The node N13 and node N23 have the same index.

The node N14 and the node N24 have the same index. The node N15 and the node N25 have the same index.

The number indicated on each node (or neuron) indicates the importance of each node. For example, the importance of the node N11 is 0.08, and the importance of the node N12 is 0.14. The indicated importance may be a normalized value. The electronic apparatus 1200 may calculate the importance of each node based on the compression method selected by the user. For example, when "L2 norm pruning" is selected in the third region 530, the electronic apparatus 1200 may calculate the importance of each node based on the L2 norm.

The electronic apparatus 1200 may determine a node to be pruned based on the compression policy and the importance of each node. Hereinafter, a pruning method according to various compression policies will be described.

When the compression policy is a first policy (average), the electronic apparatus 1200 may identify two nodes in order of low importance in each channel. For example, the electronic apparatus 1200 may identify the node N11 and the node N12 in the first layer 710. The electronic apparatus 1200 may identify the node N22 and the node N24 in the second layer 720. The electronic apparatus 1200 may calculate an average value of the identified node and a node having the same index as the identified node. For example, the electronic apparatus 1200 may calculate an average value of the importance of the node N11 and the importance of the node N21. In addition, the electronic apparatus 1200 may calculate an average value of the importance of the node N12 and the importance of the node N22. The electronic apparatus 1200 may prune nodes included in a node set having the smallest average value. For example, the electronic apparatus 1200 may prune the node N12 and the node N21. Also, the electronic apparatus 1200 may prune the node N12 and the node N22.

When the compression policy is a second policy (intersection), the electronic apparatus 1200 may identify two nodes in order of low importance in each channel. For example, the electronic apparatus 1200 may identify the node N11 and the node N12 in the first layer 710. The electronic apparatus 1200 may identify the node N22 and the node N24 in the second layer 720. The electronic apparatus 1200 may prune nodes having the same index among the identified nodes. For example, the electronic apparatus 1200 may prune the node N12 and the node N22.

When the compression policy is a third policy (union), the electronic apparatus 1200 may identify two nodes in order of low importance in each channel. For example, the electronic apparatus 1200 may identify the node N11 and the node N12 in the first layer 710. The electronic apparatus 1200 may identify the node N22 and the node N24 in the second layer 720. The electronic apparatus 1200 may prune nodes having the same index as each of the identified nodes. For example, the electronic apparatus 1200 may prune the node N11 and the node N21 having the same index as the node N11. The electronic apparatus 1200 may prune the node N12 and the node N22. The electronic apparatus 1200 may prune the node N24 and the node N14 having the same index as the node N24.

Meanwhile, in FIG. 7, the number of nodes identified in each channel is two as an example, but the present disclosure is not limited thereto. For example, the electronic apparatus 1200 may identify three or more nodes in the order of low importance in each channel.

Figure 8:
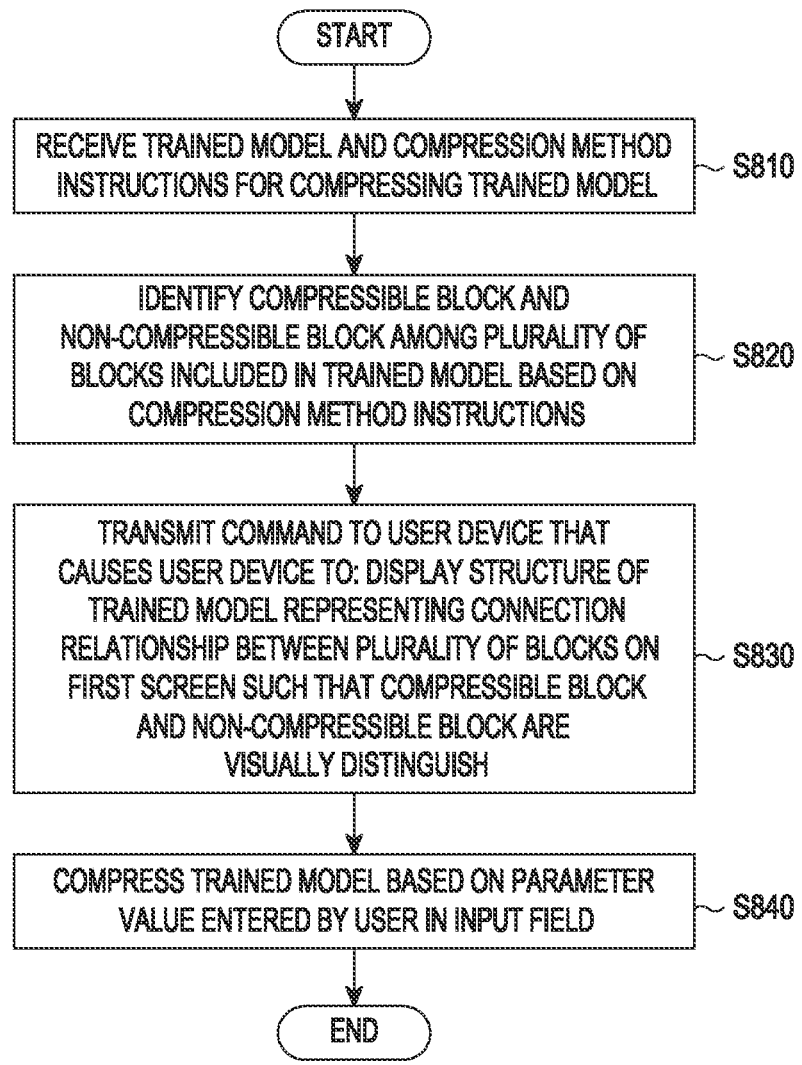
FIG. 8 is a flowchart showing a method of compressing a neural network model in accordance with embodiments of the present disclosure.

FIG. 8 is a flowchart illustrating a method of compressing a neural network model according to an embodiment of the present disclosure.

Referring to FIG. 8, the electronic apparatus 1200 may receive a trained model and a compression method for compressing the trained model (S810). For example, the electronic apparatus 1200 may acquire the trained model 115 based on the model acquisition unit 110. Alternatively, the electronic apparatus 1200 may acquire the neural network model 135.

The electronic apparatus 1200 may identify a compressible block and a non-compressible block among a plurality of blocks included in the trained model based on the compression method (S820). In the present disclosure, the non-compressible block may include not only a block for which compression may not be performed, but also a block for which compression may be performed but performance of a compressed model is smaller than a threshold value when the compression is performed.

Depending on the compression method, the criteria for determining whether the trained model can be compressed may be different. The compression method may include pruning and filter decomposition.

When the compression method is pruning, the electronic apparatus 1200 may identify a block in which an activation function, a normalization function, and an output channel are directly connected to an arithmetic operator as a non-compressible block. Here, the fact that the output channel is directly connected to the arithmetic operator may mean that other blocks having a weight value do not exist between the corresponding block and the arithmetic operator. For example, a third block, a fourth block, and a fifth block may be sequentially connected in series. The fourth block may be an activation function or a normalization function, and the fifth block may be an arithmetic operator. In this case, the third block may be a "block of which the output channel is directly connected to the arithmetic operator." Accordingly, the electronic apparatus 1200 may determine that the third block is the non-compressible block.

When the compression method is filter decomposition, the electronic apparatus 1200 may identify a block including a convolutional layer as the compressible block.

The electronic apparatus 1200 may display a structure of a trained model representing a connection relationship between a plurality of blocks on a first screen such that the compressible block and the non-compressible block are visually distinguished, and transmit a command to a user device to display an input field for receiving a configuring value for compression of a compressible block on a second screen (S830). The user device may display the structure of the trained model on the first screen based on the command received from the electronic apparatus 1200. Also, the user device may display the input field for receiving the configuring value for compression of the compressible block on the second screen. The user device may simultaneously output the first screen and the second screen.

The structure of the trained model may represent a connection relationship between a plurality of UI elements each being associated with a respective one of the plurality of blocks included in the trained model. The plurality of UI elements may each represent information on one of the plurality of blocks. The information on each of the plurality of blocks may include identification information of each of the plurality of blocks and a plurality of latencies each being associated with a respective one of the plurality of blocks. For example, the structure of the trained model may be expressed in a graph form in which a plurality of UI elements are expressed as nodes.

Meanwhile, the electronic apparatus 1200 may acquire a plurality of latencies each being associated with a respective one of the plurality of blocks using a device farm including a target device on which the trained model is to be executed. For example, when the target device is selected as the first device, the user device may transmit the information on the first device to the electronic apparatus 1200. The electronic apparatus 1200 may identify the first device in the device farm based on the information on the first device. The electronic apparatus 1200 may calculate the plurality of latencies each being associated with a respective one of the plurality of blocks by executing the trained model in the first device.

The electronic apparatus 1200 may compress the trained model based on the block compression configuring value entered by the user in the input field (S840). For example, the electronic apparatus 1200 may perform the pruning on the trained model based on the pruning ratio input by the user.

Meanwhile, when the first UI element corresponding to the compressible block displayed on the first screen is selected, the electronic apparatus 1200 may transmit a command to the user device to activate the input field corresponding to the compressible block displayed on the second screen. Accordingly, the user may input a configuring value for compression into the activated input field. Also, when the first UI element is selected, the electronic apparatus 1200 may transmit a command to the user device to display detailed information on the compressible block corresponding to the selected first UI element on the first screen.

When the second UI element corresponding to the non-compressible block displayed on the first screen is selected, the electronic apparatus 1200 may transmit a command to the user device to display detailed information on the non-compressible block on the first screen. The detailed information on the non-compressible block may include at least one of the quantity of channels or a size of a kernel included in the non-compressible block.

In FIG. 8, it has been described that the user device displays the first screen and the second screen based on the command received from the electronic apparatus 1200. In another embodiment, the user device may display the first screen and the second screen based on a user input without the command received from the electronic apparatus 1200. For example, when a user input for selecting a UI element corresponding to the first compressible block displayed on the first screen is acquired, the user device may activate the first input field corresponding to the first block displayed on the second screen.

Hereinafter, the first screen and the second screen will be described in detail.

Figure 9:
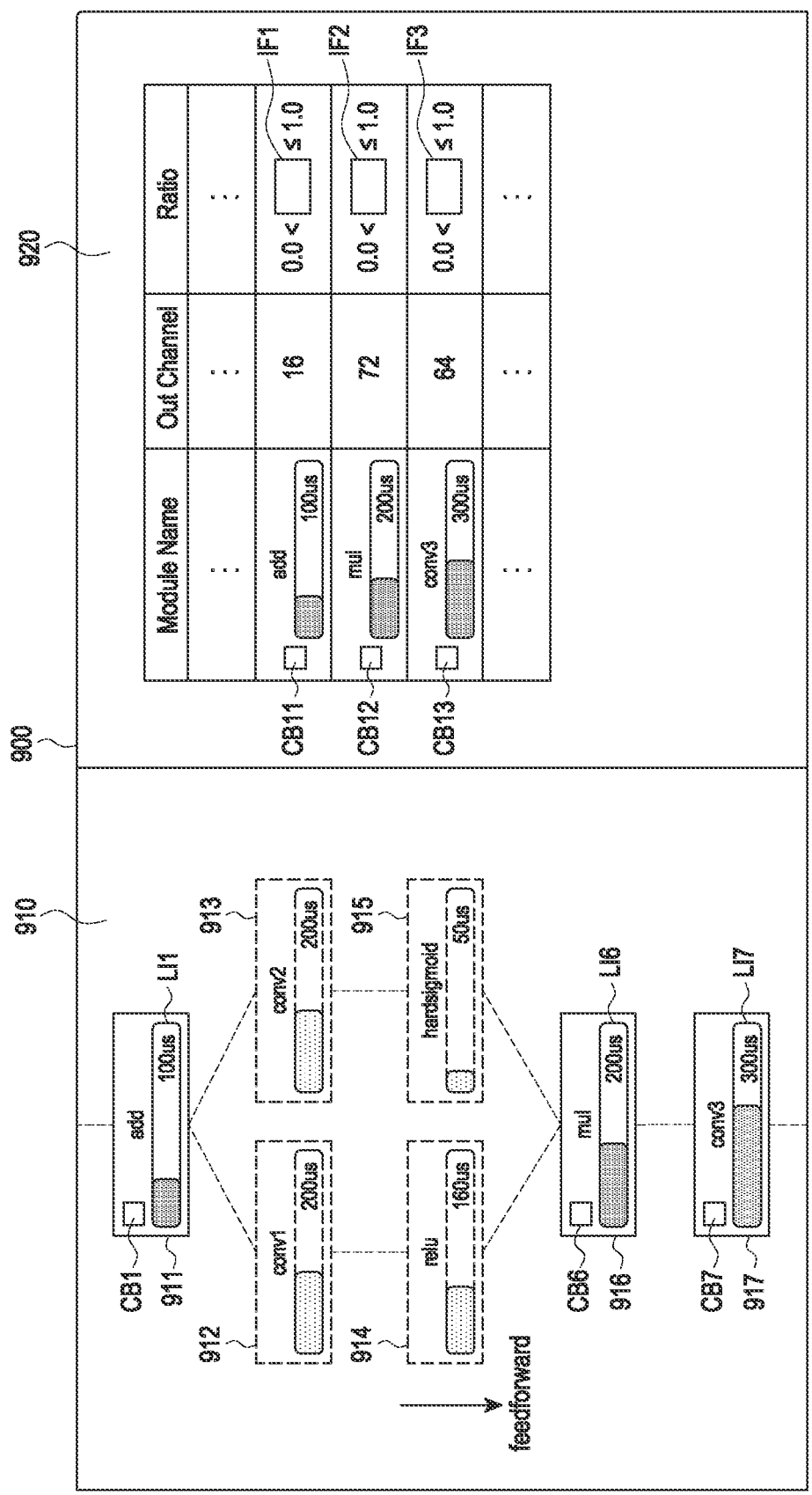
FIG. 9 is a diagram showing a screen for setting a block compression configuring value in accordance with embodiments of the present disclosure.

FIG. 9 is a screen for setting a block compression configuring value according to an embodiment of the present disclosure. A screen 900 may be displayed on the user device when the compression mode is a second compression mode. A user may input a block compression configuring value corresponding to a block included in a trained model to be compressed based on the screen 900.

Referring to FIG. 9, the screen 900 may include a first screen 910 and a second screen 920. The user device may display the structure of the trained model on the first screen 910. For example, the structure of the trained model may be a hierarchical structure in which a plurality of UI elements 911, 912, 913, 914, 915, 916, and 917 each being associated with a respective one of the plurality of blocks (add, conv1, conv2, relu, hardsigmoid, mul, and conv3) included in the trained model are represented by nodes. The structure of the trained model may represent a connection relationship between a plurality of UI elements 911, 912, 913, 914, 915, 916, and 917.

The user device may display the plurality of UI elements 911, 912, 913, 914, 915, 916, and 917 on the first screen 910. Each of the plurality of UI elements 911, 912, 913, 914, 915, 916, and 917 may indicate information on a corresponding block. For example, the first UI element 911 corresponding to the first block (add) may include an indicator LI1 indicating a latency corresponding to the first block (add). As such, when the latency corresponding to the block is displayed on the screen 900, the user may refer to the displayed latency when determining a block compression configuring value. That is, the configuring value for compression of each block may be determined based on the latency corresponding to each block. In addition, the user convenience may be improved.

The user device may distinguish and display the compressible block and the non-compressible block. In FIG. 9, the electronic apparatus 1200 may determine a first block (add), a sixth block (mul), and a seventh block (conv3) as compressible blocks. The electronic apparatus 1200 may determine a second block (conv1), a third block (conv2), a fourth block (relu), and a fifth block (hardsigmoid) as non-compressible blocks. Specifically, since output channels of the second block (conv1) and the third block (conv2) are directly connected to a sixth block (mul), which is a multiplication operator, the second block (conv1) and the third block (conv2) may be determined as the non-compressible blocks. Since the fourth block (relu) and the fifth block (hardsigmoid) are activation functions, it may be determined that the fourth block (relu) and the fifth block (hardsigmoid) are the non-compressible blocks.

For example, the UI elements 911, 916, and 917 corresponding to the compressible blocks (add, mul, and conv3) may include check boxes CB1, CB6, and CB7. The UI elements 912, 913, 914, and 915 corresponding to the non-compressible blocks (conv1, conv2, relu, and hardsigmoid) may not include a check box. The UI elements 911, 916, and 917 may be displayed with better visibility than the UI elements 912, 913, 914, and 915. For example, the UI elements 911, 916, and 917 may be displayed brighter than the UI elements 912, 913, 914, and 915. Alternatively, the UI elements 911, 916, and 917 may be displayed with a solid line and the UI elements 912, 913, 914, and 915 may be displayed with a dotted line.

The user device may display the information on the compressible block on the second screen 920. For example, the user device may indicate the quantity of output channels and names of each of the compressible blocks (add, mul, and conv3). The user device may display an input field for receiving a configuring value for compression of the compressible block. Here, the configuring value for compression means the block compression configuring value described above. For example, the user device may display input fields IF1, IF2, and IF3 each being associated with a respective one of the compressible blocks (add, mul, and conv3). The input fields IF1, IF2, and IF3 may receive a pruning ratio. Also, the user device may display check boxes CB11, CB12, and CB13 for selecting each of the compressible blocks (add, mul, and conv3).

Figure 10:
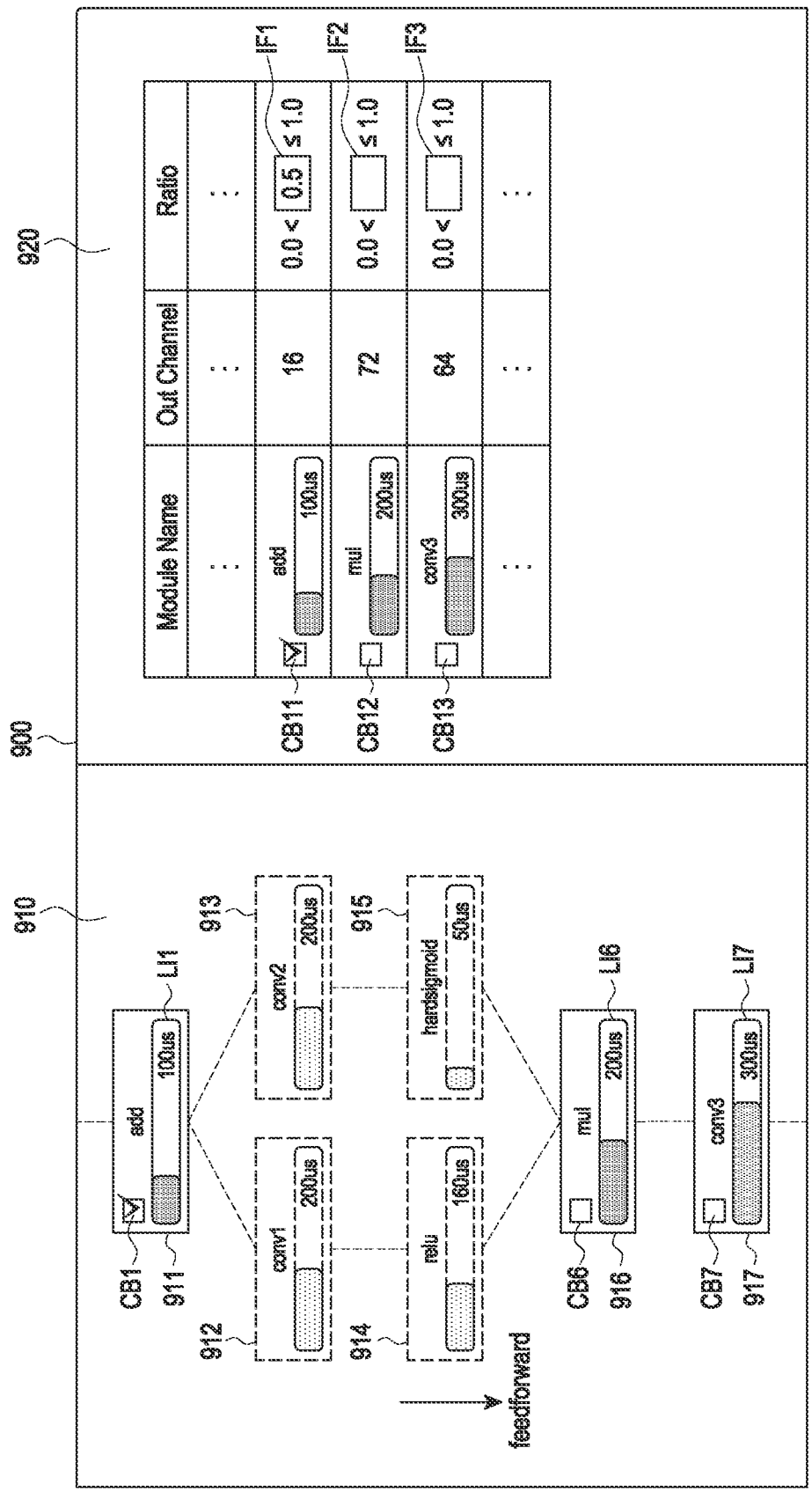
FIG. 10 is a diagram showing a screen for setting a block compression configuring value in accordance with embodiments of the present disclosure.

FIG. 10 is a screen for setting a block compression configuring value according to an embodiment of the present disclosure.

Referring to FIG. 10, the user device may display the second screen 920 based on a user input acquired through the first screen 910. For example, the first UI element 911 or the first block (add) may be selected by the user. For example, a user may click the check box CB1. The user device may display a check mark in the check box CB11 corresponding to the selected first block (add), and activate the first input field IF1. The selection of the first UI element 911 may be released. In this case, the user device may deactivate the first input field IF1.

The user device may display the first screen 910 based on the user input acquired through the second screen 920. For example, when the check box CB11 corresponding to the first block (add) is selected, the user device may display a check mark in the check box CB1 corresponding to the first block (add). When the selection of the check box CB11 is released, the user device may remove the check mark displayed in the check box CB1.

Figure 11:
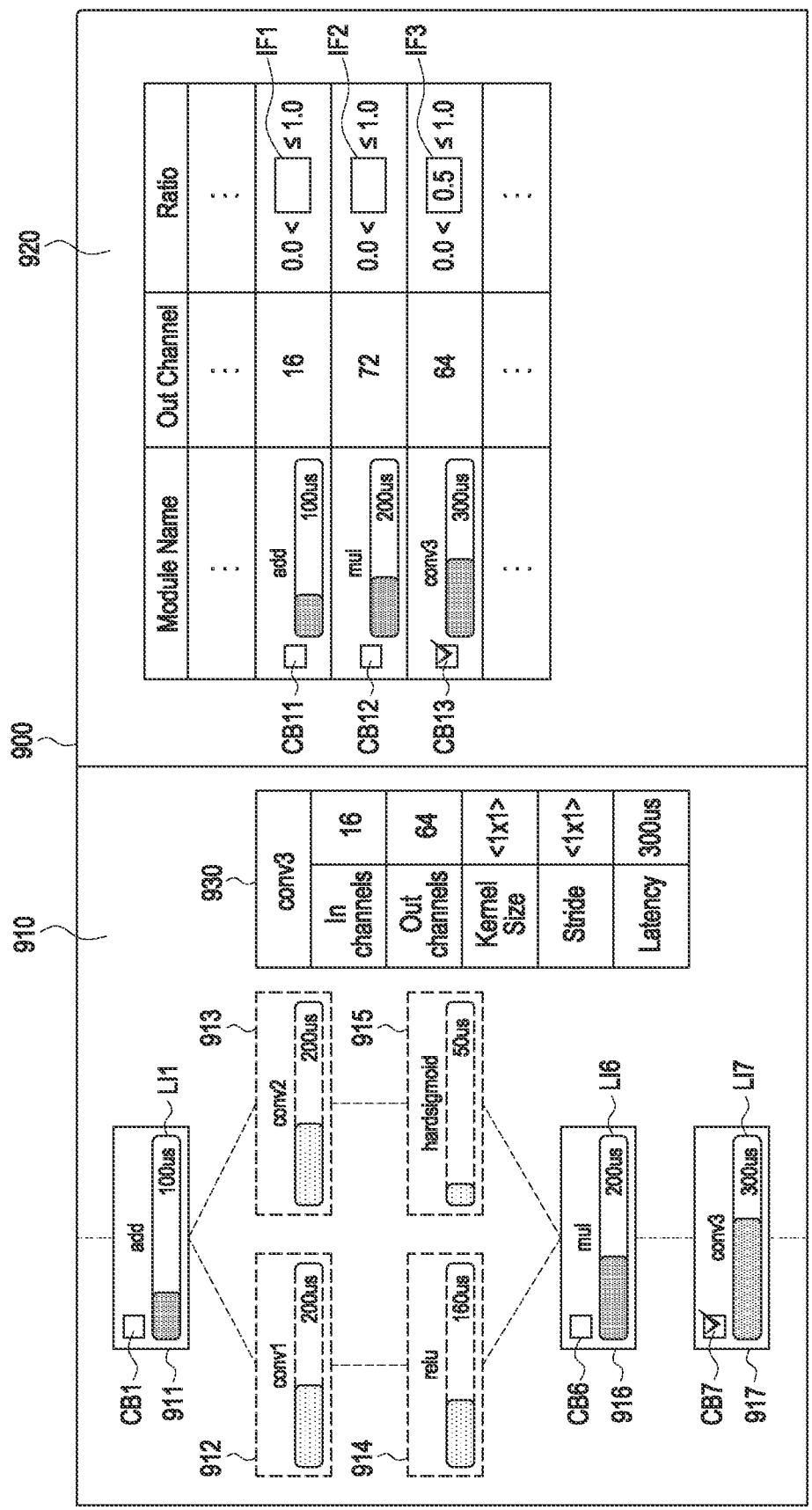
FIG. 11 is a diagram showing a screen for setting a block compression configuring value in accordance with embodiments of the present disclosure.

FIG. 11 is a screen for setting a block compression configuring value according to an embodiment of the present disclosure.

Referring to FIG. 11, the user device may provide detailed information related to a block selected by a user. The detailed information related to the block may include at least one of the quantity of channels, a size of a kernel, a stride, or latency included in the block. For example, the seventh block (conv3) may be selected. In this case, the user device may display detailed information 930 related to the seventh block (conv3) on the first screen 910. Meanwhile, the user may select a non-compressible block. For example, the user may select the second block (conv1). In this case, the user device may display detailed information related to the second block (conv2) on the first screen 910.

Meanwhile, FIGS. 9 to 11 illustrate that the input field receives a ratio value greater than 0 and less than or equal to 1 as a block compression configuring value. However, the present disclosure is not limited thereto, and the range of the block compression configuring value may be variously changed according to the compression method. For example, when the compression method is a second type of pruning based on an index, the input field may receive an index of a channel to be pruned. As another example, when the compression method is Tucker decomposition, the input field may receive the quantity of input channels of the core tensor and the quantity of output channels of the core tensor.

Meanwhile, a block compression configuring value may be input by a user or may be determined by the electronic apparatus 1200. For example, the electronic apparatus 1200 may configure the compression ratio of each block based on the latency corresponding to each block. The electronic apparatus 1200 may configure the compression rate of the block to be higher as the latency corresponding to the block increases. Referring to FIG. 9, the compression ratio corresponding to the first block (add) may be smaller than the compression ratio corresponding to the sixth block (mul).

Figure 12:
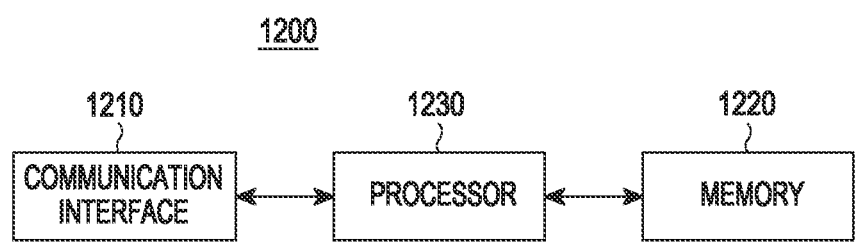
FIG. 12 is a block diagram illustrating a configuration of the electronic apparatus according to the embodiment of the disclosure.

FIG. 12 is a block diagram illustrating a configuration of the electronic apparatus according to the embodiment of the disclosure.

Referring to FIG. 12, the electronic apparatus 1200 may include a communication interface 1210, a memory 1220, and a processor 1230. For example, the electronic apparatus 1200 may be implemented as a physical server or a cloud server.

The communication interface 1210 includes at least one communication circuit and may communicate with various types of external devices. For example, the communication interface 1210 may receive information on a data set and a target device from an external device. The external device may be a user device. The user device may include personal computers and mobile devices. The communication interface 1210 may transmit information on a plurality of base models retrieved based on the information on the target device to the external device. Accordingly, the external device may output the information on the plurality of base models. The communication interface 1210 may receive a user command for selecting at least one of the plurality of base models from the external device.

The communication interface 1210 may transmit at least one selected base model and data set to an external server. The external server may acquire a trained neural network model (or trained model) after training at least one base model selected using the data set. The communication interface 1210 may receive a trained model from the external server.

The communication interface 1210 may transmit the trained model to the external device. The communication interface 1210 may transmit information on the trained model to the external device. The information on the trained model may include a name of the trained model, a task performed by the trained model, information on a target device corresponding to the trained model, and performance (e.g., accuracy and latency) of the trained model. Meanwhile, in the present disclosure, acquiring/storing/transmitting/receiving a neural network model means acquiring/storing/transmitting/receiving data (e.g., architecture, weight) related to a model.

The communication interface 1210 may include at least one of a Wi-Fi communication module, a cellular communication module, a 3rd generation (3G) mobile communication module, a 4th generation (4G) mobile communication module, a 4th generation long term evolution (LTE) communication module, a 5th generation (5G) mobile communication, or wired Ethernet.

The memory 1220 may store an operating system (OS) for controlling an overall operation of the components of the electronic apparatus 1200 and commands or data related to the components of the electronic apparatus 1200. The memory 1220 may be implemented as a non-volatile memory (e.g., a hard disk, a solid state drive (SSD), and a flash memory), a volatile memory, or the like.

The memory 1220 may include a database (DB). For example, the memory 1220 may include a data set DB for storing a data set. The memory 1220 may include a project DB for storing a project. The memory 1220 may include a model DB for storing the trained model. The information stored in the DB may be provided to a user. For example, a data set list, a project list, and/or a model list may be displayed on an external device.

The memory 1220 may store information on a plurality of neural network models. For example, the memory 1220 may store a look-up table in which identification information of a plurality of neural network models, information on a target device, and performance information of a plurality of neural network models are matched. The performance information of the plurality of neural network models may reflect performance (e.g., latency) of each of the plurality of neural network models when the neural network models are executed in the target device. The performance of the neural network model for the target device may be the performance of the neural network model when the neural network model is executed in the target device. The latency of the neural network model may be acquired from a device farm. The accuracy of the neural network model may be acquired using test data.

The memory 1220 may store a predefined algorithm for searching for the base model. The predefined algorithm may include at least one of a hyper-parameter optimization (HPO) algorithm or a neural architecture search (NAS) algorithm. The hyper-parameter optimization algorithm may include a tree-structured parzen estimator (TPE) algorithm. The TPE algorithm may be based on Bayesian optimization. The neural network architecture search algorithm may be based on an evolutionary algorithm.

The processor 1230 may be electrically connected to the memory 1220 to control overall operations and functions of the electronic apparatus 1200. The processor 1230 may control the electronic apparatus 1200 by executing instructions stored in the memory 1220.

The processor 1230 may acquire a trained model and a compression method for compressing the trained model. For example, the processor 1230 may acquire the trained model 115 based on the model acquisition unit 110. Alternatively, the processor 1230 may acquire the neural network model 135.

The processor 1230 may identify a compressible block and a non-compressible block among a plurality of blocks included in the trained model based on the compression method.

Depending on the compression method, the criteria for determining whether the trained model can be compressed may be different. The compression method may include pruning and filter decomposition.

When the compression method is pruning, the processor 1230 may identify a block in which an activation function, a normalization function, and an output channel are directly connected to an arithmetic operator as a non-compressible block. Here, the fact that the output channel is directly connected to the arithmetic operator may mean that other blocks having a weight value do not exist between the corresponding block and the arithmetic operator. For example, a third block, a fourth block, and a fifth block may be sequentially connected in series. The fourth block may be an activation function or a normalization function, and the fifth block may be an arithmetic operator. In this case, the third block may be a "block of which the output channel is directly connected to the arithmetic operator." Accordingly, the processor 1230 may determine that the third block is the non-compressible block.

When the compression method is filter decomposition, the processor 1230 may identify a block including a convolutional layer as the compressible block.

A structure of a trained model may represent a connection relationship between a plurality of blocks on a first screen such that the compressible block and the non-compressible block are visually distinguished. The processor 1230 may control the communication interface 1210 to transmit a command to a user device to display an input field for receiving a configuring value for compression of a compressible block on a second screen. The user device may display the structure of the trained model on the first screen based on the command received from the electronic apparatus 1200. Also, the user device may display the input field for receiving the configuring value for compression of the compressible block on the second screen. The user device may simultaneously output the first screen and the second screen.

The structure of the trained model may represent a connection relationship between a plurality of UI elements each being associated with a respective one of the plurality of blocks included in the trained model. The plurality of UI elements may each represent information on one of the plurality of blocks. The information on each of the plurality of blocks may include identification information of each of the plurality of blocks and a plurality of latencies each being associated with a respective one of the plurality of blocks. For example, the structure of the trained model may be expressed in a graph form in which a plurality of UI elements are expressed as nodes.

Meanwhile, the processor 1230 may acquire a plurality of latencies each being associated with a respective one of the plurality of blocks using a device farm including a target device on which the trained model is to be executed. For example, when the target device is selected as the first device, the user device may transmit the information on the first device to the electronic apparatus 1200. The processor 1230 may identify the first device in the device farm based on the information on the first device. The processor 1230 may calculate the plurality of latencies each being associated with a respective one of the plurality of blocks by executing the trained model in the first device.

The processor 1230 may compress the trained model based on the block compression configuring value input by the user in the input field. For example, the processor 1230 may perform the pruning on the trained model based on the pruning ratio input by the user.

Various exemplary embodiments of the present disclosure described above may be implemented in a computer or a computer readable recording medium using software, hardware, or a combination of software and hardware. In some cases, embodiments described in the present disclosure may be implemented as the processor itself. According to a software implementation, embodiments such as procedures and functions described in the disclosure may be implemented as separate software modules. Each of the software modules may perform one or more functions and operations described in the disclosure.

Computer instructions for performing processing operations according to the diverse embodiments of the disclosure described above may be stored in a non-transitory computer-readable medium. The computer instructions stored in the non-transitory computer-readable medium allow a specific machine to perform the processing operations according to the diverse embodiments described above when they are executed by a processor.

The non-transitory computer-readable medium is not a medium that stores data for a while, such as a register, a cache, a memory, or the like, but is a medium that semi-permanently stores data and is readable by the apparatus. A specific example of the non-transitory computer-readable medium may include a compact disk (CD), a digital versatile disk (DVD), a hard disk, a Blu-ray disk, a universal serial bus (USB), a memory card, a read only memory (ROM), or the like.

The machine-readable storage medium may be provided in the form of a non-transitory storage medium. Here, the "non-transitory storage medium" means that the storage medium is a tangible device, and does not include a signal (for example, electromagnetic waves), and the term does not distinguish between the case where data is stored semi-permanently on a storage medium and the case where data is temporarily stored thereon. For example, the "non-transitory storage medium" may include a buffer in which data is temporarily stored.

The methods according to the diverse embodiments disclosed in the document may be included and provided in a computer program product. The computer program product may be traded as a product between a seller and a purchaser. The computer program product may be distributed in the form of a machine-readable storage medium (for example, compact disc read only memory (CD-ROM)), or may be distributed (for example, download or upload) through an application store (for example, Play Store™) or may be directly distributed (for example, download or upload) between two user devices (for example, smart phones) online. In a case of the online distribution, at least some of the computer program products (for example, downloadable app) may be at least temporarily stored in a machine-readable storage medium such as a memory of a server of a manufacturer, a server of an application store, or a relay server or be temporarily created.

According to various embodiments of the present disclosure as described above, it is possible to provide a neural network model optimized for a target device.

According to various embodiments of the present disclosure as described above, it is possible to provide a neural network model trained based on a data set input by a user.

According to various embodiments of the present disclosure as described above, it is possible to provide a compressed neural network model based on a configuring value for compression input by a user.

According to various embodiments of the present disclosure as described above, it is possible to provide download data corresponding to the compressed neural network model.

Accordingly, it is possible to improve user convenience and satisfaction.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

It is contemplated that any optional feature of the inventive variations described may be set forth and claimed independently, or in combination with any one or more of the features described herein. It is further noted that the claims may be drafted to exclude any optional element for an embodiment. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs. The breadth of the present invention is not to be limited by the subject specification, but rather only by the plain meaning of the claim terms employed.

In addition, the effects that can be obtained or predicted by embodiments of the present disclosure have been disclosed directly or implicitly in the detailed description of the embodiments of the present disclosure. For example, various effects predicted according to the embodiments of the present disclosure have been disclosed in the above-described detailed description.

The embodiments described herein and the claims thereto are directed to patent eligible subject matter. These embodiments do not constitute abstract ideas for a myriad of reasons. One such reason is that any claim that provides for the ability of neural network optimization. These apparatuses and computer implemented methods allow for determination of a target device attributes and acquire and/or use a neural network model that is optimized for a target device and thereby constitute an improvement to the functioning of the computer itself, which may otherwise run sub-optimized neural networks and thus qualifies as "significantly more" than an abstract idea.

Other aspects, advantages, and prominent features of the present disclosure will become apparent to those skilled in the art from the above detailed description which discloses various embodiments of the present disclosure taken in conjunction with the accompanying drawings.

Although the embodiments of the disclosure have been illustrated and described hereinabove, the disclosure is not limited to the above-described specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. A method of compressing a neural network model that is performed by a computing device, comprising:
   receiving, at a processor of the computing device, a trained model and compression method instructions for compressing the trained model;
   identifying, via the processor, a compressible block and a non-compressible block among a plurality of blocks included in the trained model based on the compression method instructions;
   transmitting, via a computer network, a command to a user device that causes the user device to:
      display a structure of the trained model representing a connection relationship between the plurality of blocks on a first screen such that the compressible block and the non-compressible block are visually distinguished, and
      display, on a second screen, an input field operable to receive a parameter value entered by a user for compression of the compressible block; and
   compressing the trained model based on the parameter value entered by the user in the input field.

2. The method of claim 1, wherein when the compression method instructions configure a method of pruning, the identifying comprises:
   identifying among the plurality of blocks a non-compressible block which includes an activation function, a normalization function and an output channel that are directly connected to an arithmetic operator.

3. The method of claim 1, wherein when the compression method instructions configure a method of filter decomposition, the identifying comprises:
   identifying among the plurality of blocks the compressible block which includes a convolutional layer.

4. The method of claim 1, wherein the structure of the trained model is represented by a connection between a plurality of user interface (UI) elements, each of the plurality of UI elements is associated with a respective one block of the plurality of blocks included in the trained model, each of the plurality of UI elements represents information on an associated block of the plurality of blocks, and
   the information on the associated block of the plurality of blocks includes identification information for the associated block and latency data corresponding to the associated block.

5. The method of claim 1, further comprising:
   receiving information, via a computer network, about a target device on which the trained model is to be executed; and receiving a plurality of latency data from the target device,
wherein each latency data of the plurality of latency data is associated with a respective one block of the plurality of blocks.

6. The method of claim 1, further comprising:
when a user selects a first UI element that corresponds to the compressible block and that is displayed on the first screen, transmitting a command to the user device to activate the input field corresponding to the compressible block displayed on the second screen.

7. The method of claim 1, further comprising:
when a user selects a second UI element that corresponds to the non-compressible block and that is displayed on the first screen, transmitting a command to the user device to display detailed information about the non-compressible block on the first screen,
wherein the detailed information on the non-compressible block includes at least one of a quantity of channels or a size of a kernel included in the non-compressible block.

8. The method of claim 1, wherein the structure of the trained model is a tree structure.

9. The method of claim 1, further comprising:
when a user selects a first UI element that corresponds to the compressible block and that is displayed on the first screen, transmitting a command to the user device to display detailed information on the compressible block on the first screen,
wherein the detailed information on the compressible block includes at least one of a quantity of channels or the size of a kernel included in the compressible block.

10. The method of claim 9, wherein the first UI element includes a check box.

11. An electronic apparatus for compressing a neural network model, comprising:
a communication interface, configured to send and receive data via a data network, including at least one communication circuit;
a non-transitory memory configured to store at least one operation instruction; and
a processor,
wherein execution of the at least one operation instruction causes the processor to:
receive a trained model and compression method instructions for compressing the trained model;
identify a compressible block and a non-compressible block among a plurality of blocks included in the trained model based on the compression method instructions;
transmit a command to a user device via the communication interface that results in the user device:
displaying a structure of the trained model representing a connection relationship between the plurality of blocks on a first screen such that the compressible block and the non-compressible block are visually distinguished, and
displaying an input field operable to receive a parameter value for compression of the compressible block on a second screen; and
compressing the trained model based on the parameter value entered by the user in the input field.

12. The electronic apparatus of claim 11, wherein, when the compression method instructions correspond to a method of pruning, the processor is further configured to:
identify among the plurality of blocks a non-compressible block which includes an activation function, a normalization function, and an output channel that are directly connected to an arithmetic operator.

13. The electronic apparatus of claim 11, wherein when the compression method instructions correspond to a method of filter decomposition, the processor is further configured to:
identify among the plurality of blocks the compressible block which includes a convolutional layer.

14. The electronic apparatus of claim 11,
wherein the structure of the trained model is represented as connections between a plurality of user interface (UI) elements,
wherein each of the plurality of UI elements:
is associated with a respective one block of the plurality of blocks included in the trained model, and
represents information regarding an associated block of the plurality of blocks, including identification information for the associated block, and latency data corresponding to the associated block.

15. The electronic apparatus of claim 11, wherein the processor is further configured to:
receive information about a target device on which the trained model is to be executed; and
receive a plurality of latency data from the target device,
wherein each latency data of the plurality of latency data corresponds to a respective block of the plurality of blocks.

16. The electronic apparatus of claim 11, wherein, when a user selects a first UI element that corresponds to the compressible block and that is displayed on the first screen, the processor is further configured to cause the communication interface to transmit a command to the user device to activate the input field corresponding to the compressible block displayed on the second screen.

17. The electronic apparatus of claim 11,
wherein, when a user selects a second UI element that corresponds to the non-compressible block and that is displayed on the first screen, the processor is further configured to cause the communication interface to transmit a command to the user device to display detailed information about the non-compressible block on the first screen, and
wherein the detailed information on the non-compressible block includes at least one of a quantity of channels or a size of a kernel included in the non-compressible block.

18. The electronic apparatus of claim 11, wherein the structure of the trained model is a tree structure.

19. The electronic apparatus of claim 11,
wherein, when a user selects a first UI element that corresponds to the compressible block and that is displayed on the first screen, the processor is further configured to transmit a command to the user device to display detailed information on the compressible block on the first screen, and
wherein the detailed information on the compressible block includes at least one of a quantity of channels or the size of a kernel included in the compressible block.

20. A computer-readable recording medium on which is recorded a program that causes a computing device to execute the method of claim 1.

* * * * *